(12) United States Patent
Kar et al.

(10) Patent No.: US 8,963,733 B2
(45) Date of Patent: Feb. 24, 2015

(54) SYSTEM AND METHOD FOR BLIND FAULT DETECTION FOR ROTATING MACHINERY

(75) Inventors: Chinmaya Kar, Karnataka (IN); Rajat Sadana, Phoenix, AZ (US); Joydeb Mukherjee, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 138 days.

(21) Appl. No.: 13/371,576

(22) Filed: Feb. 13, 2012

(65) Prior Publication Data

US 2013/0207810 A1 Aug. 15, 2013

(51) Int. Cl.
F16C 17/24 (2006.01)

(52) U.S. Cl.
USPC ..... 340/686.3; 340/682; 340/683; 340/686.1; 340/679; 340/686.2; 702/35; 702/36; 702/56; 702/77; 702/185

(58) Field of Classification Search
USPC ........ 340/686.3, 686.1, 682–683; 702/34–37, 702/75–77
See application file for complete search history.

(56) References Cited

U.S. PATENT DOCUMENTS

| | | | |
|---|---|---|---|
| 4,060,716 A * | 11/1977 | Pekrul et al. | 702/184 |
| 4,237,454 A * | 12/1980 | Meyer | 340/682 |
| 4,286,515 A | 9/1981 | Baumann et al. | |
| 4,621,177 A | 11/1986 | Pulkowski et al. | |
| 4,675,487 A | 6/1987 | Verkasalo | |
| 4,704,191 A | 11/1987 | Wedel | |
| 4,758,964 A * | 7/1988 | Bittner et al. | 702/34 |
| 4,885,707 A | 12/1989 | Nichol et al. | |
| 4,931,949 A * | 6/1990 | Hernandez et al. | 702/35 |
| 5,262,958 A | 11/1993 | Chui et al. | |
| 5,381,697 A | 1/1995 | van der Pol | |
| 5,479,824 A | 1/1996 | Torres | |
| 5,501,105 A * | 3/1996 | Hernandez et al. | 73/660 |
| 5,511,422 A * | 4/1996 | Hernandez | 73/593 |

(Continued)

FOREIGN PATENT DOCUMENTS

| | | |
|---|---|---|
| EP | 1 528 377 A2 | 5/2005 |
| EP | 1 097 363 B1 | 12/2007 |

(Continued)

OTHER PUBLICATIONS

Laibin Zhang, et al., "Short-term fault prediction of mechanical rotating parts on the basis of fuzzy-grey optimising method", Mechanical Systems and Signal Processing 21 (2007), p. 856-865.

(Continued)

*Primary Examiner* — Daniel Wu
*Assistant Examiner* — Son M Tang

(57) ABSTRACT

A system includes more sensors configured to measure one or more characteristics of rotating equipment and a blind fault detection device. The blind fault detection device includes an input interface configured to receive at least one input signal from the one or more sensors. The blind fault detection device also includes a processing unit configured to identify a fault in the rotating equipment using the at least one input signal. The blind fault detection device further includes an output interface configured to provide an indicator identifying the fault. The processing unit is configured to identify the fault by determining at least one family of frequencies related to at least one sensor point, determining an average energy for the at least one sensor point based on the at least one family of frequencies, and comparing the average energy to a baseline value.

24 Claims, 12 Drawing Sheets

(56) References Cited

U.S. PATENT DOCUMENTS

| | | | |
|---|---|---|---|
| 5,519,337 A | 5/1996 | Casada | |
| 5,594,180 A | 1/1997 | Carpenter et al. | |
| 5,616,824 A | 4/1997 | Abdel-Malek et al. | |
| 5,641,891 A | 6/1997 | Frankl et al. | |
| 5,646,600 A | 7/1997 | Abdel-Malek et al. | |
| 5,750,879 A | 5/1998 | Ohtsuka et al. | |
| 5,875,420 A * | 2/1999 | Piety et al. | 702/182 |
| 5,939,625 A | 8/1999 | Torii et al. | |
| 5,943,634 A * | 8/1999 | Piety et al. | 702/56 |
| 5,966,674 A | 10/1999 | Crawford et al. | |
| 6,053,047 A * | 4/2000 | Dister et al. | 73/593 |
| 6,208,943 B1 | 3/2001 | Randolph et al. | |
| 6,225,892 B1 * | 5/2001 | Chene | 340/438 |
| 6,298,308 B1 | 10/2001 | Reid et al. | |
| 6,330,525 B1 | 12/2001 | Hays et al. | |
| 6,349,637 B1 | 2/2002 | Molteni | |
| 6,370,957 B1 | 4/2002 | Fillippenko et al. | |
| 6,408,676 B1 | 6/2002 | Stratton et al. | |
| 6,484,109 B1 | 11/2002 | Lofall | |
| 6,505,517 B1 | 1/2003 | Eryurek et al. | |
| 6,507,789 B1 | 1/2003 | Reddy et al. | |
| 6,526,356 B1 * | 2/2003 | DiMaggio et al. | 702/35 |
| 6,526,831 B2 | 3/2003 | Ben-Romdhane | |
| 6,539,315 B1 | 3/2003 | Adams et al. | |
| 6,567,709 B1 * | 5/2003 | Malm et al. | 700/21 |
| 6,654,697 B1 | 11/2003 | Eryurek et al. | |
| 6,657,529 B1 | 12/2003 | Albach | |
| 6,681,634 B2 | 1/2004 | Sabini et al. | |
| 6,694,285 B1 * | 2/2004 | Choe et al. | 702/182 |
| 6,725,167 B2 | 4/2004 | Grumstrup et al. | |
| 6,727,725 B2 | 4/2004 | Devaney et al. | |
| 6,757,668 B1 | 6/2004 | Goebel et al. | |
| 6,792,360 B2 | 9/2004 | Smulders et al. | |
| 6,802,221 B2 * | 10/2004 | Hedeen et al. | 73/587 |
| 6,845,340 B2 | 1/2005 | Edie et al. | |
| 6,900,420 B2 | 5/2005 | Markegard et al. | |
| 6,901,335 B2 * | 5/2005 | Wang et al. | 702/35 |
| 6,925,879 B2 | 8/2005 | Raichle | |
| 6,933,693 B2 | 8/2005 | Schuchmann | |
| 6,941,785 B2 | 9/2005 | Haynes et al. | |
| 7,027,953 B2 * | 4/2006 | Klein | 702/184 |
| 7,099,782 B2 * | 8/2006 | Hitchcock et al. | 702/56 |
| 7,257,501 B2 | 8/2007 | Zhan et al. | |
| 7,274,995 B2 | 9/2007 | Zhan et al. | |
| 7,286,945 B2 | 10/2007 | Zhan et al. | |
| 7,289,919 B2 * | 10/2007 | Boerhout | 702/56 |
| 7,421,374 B2 | 9/2008 | Zhan et al. | |
| 7,822,580 B2 * | 10/2010 | Mustonen | 702/199 |
| 7,912,659 B2 * | 3/2011 | Luo | 702/56 |
| 7,945,397 B2 * | 5/2011 | Kar | 702/34 |
| 7,970,556 B2 * | 6/2011 | Hala et al. | 702/34 |
| 2002/0020144 A1 | 2/2002 | Sarles et al. | |
| 2002/0169569 A1 | 11/2002 | Miller | |
| 2003/0019297 A1 | 1/2003 | Fiebelkorn et al. | |
| 2003/0216888 A1 | 11/2003 | Ridolfo | |
| 2004/0024568 A1 | 2/2004 | Eryurek et al. | |
| 2004/0159112 A1 | 8/2004 | Jayanth et al. | |
| 2005/0096873 A1 | 5/2005 | Klein | |
| 2005/0104020 A1 | 5/2005 | Zhan et al. | |
| 2006/0025970 A1 | 2/2006 | Wegerich | |
| 2006/0071666 A1 | 4/2006 | Unsworth et al. | |
| 2007/0088534 A1 | 4/2007 | MacArthur et al. | |
| 2010/0030492 A1 | 2/2010 | Kar et al. | |
| 2010/0106458 A1 | 4/2010 | Leu et al. | |
| 2010/0256932 A1 * | 10/2010 | Kar | 702/56 |
| 2011/0156921 A1 | 6/2011 | Kyllingstad | |
| 2011/0307218 A1 | 12/2011 | Kar et al. | |
| 2013/0049733 A1 * | 2/2013 | Neti et al. | 324/71.1 |
| 2013/0207810 A1 * | 8/2013 | Kar et al. | 340/686.3 |

FOREIGN PATENT DOCUMENTS

| | | | |
|---|---|---|---|
| JP | 62226033 A | 10/1987 | |
| JP | 07-43278 B2 | 5/1995 | |
| JP | 2005147081 A | 6/2005 | |
| KR | 20030048779 A | 6/2003 | |
| KR | 20050011919 A | 1/2005 | |
| WO | WO 03/090091 A1 | 10/2003 | |

OTHER PUBLICATIONS

Michael J. Devaney, et al., "Detecting Motor Bearing Faults", IEEE Instrumentation & Measurements Magazine, Dec. 2004, p. 30-35 & 50.

Jason R. Stack, et al., "Fault Classification and Fault Signature Production for Rolling Element Bearings in Electric Machines", IEEE Transactions on Industry Applications, vol. 40, No. 3 May/Jun. 2004, p. 735-739.

Peter W. Tse, et al., "Wavelet Analysis and Envelope Detection for Rolling Element Bearing Fault Diagnosis—Their Effectiveness and Flexibilities", Journal of Vibration and Acoustics, Jul. 2001, vol. 123, p. 303-310.

V. Sugumaran, et al., "Automatic rule learning using decision tree for fuzzy classifier in fault diagnosis of roller bearing", Mechanical Systems and Signal Processing 21 (2007), p. 2237-2247.

Yaguo Lei, et al., "Fault diagnosis of rotating machinery based on multiple ANFIS combination with GA s", Mechanical Systems and Signal Processing 21 (2007), p. 2280-2294.

Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.

Robert B. Randall, "State of the Art in Monitoring Rotating Machinery—Part 1", Sound and Vibration, Mar. 2004, p. 14-20.

Z.K. Peng, et al., "A comparison study of improved Hilbert-Huang transform and wavelet transform: Application to Fault disgnosis for rolling bearing", Mechanical Systems and Signal Processing 19 (2005), p. 974-988.

Xinsheng Lou, et al., "Bearing fault diagnosis based on wavelet transform and fuzzy inference", Mechanical Systems and Signal Processing 18 (2004) p. 1077-1095.

T.I. Liu, et al., "Detection of Roller Bearing Defects Using Expert System and Fuzzy Logic", Mechanical Systems and Signal Processing (1996) 10(5), p. 595-614.

Yaguo Lei, et al., "A new approach to intelligent fault diagnosis of rotating machinery", Expert Systems with Applictaions 35 (2008), p. 1593-1600.

Paula J. Dempsey, et al., "Tapered Roller Bearing Damage Detection Using Decision Fusion Analysis", NASA/TM-2006-21430, Jul. 2006, 23 pages.

A.R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Vibration and current transient monitoring for gearbox fault detection using multiresolution Fourier transform", Journal of Sound and Vibration 311 (2008), p. 109-132.

Chinmaya Kar, et al., "Monitoring gear vibrations through motor current signature analysis and wavelet transform", Mechanical Systems and Signal Processing 20 (2006), p. 158-187.

T. Lindth et al., "Automatic bearing fault classification combining statistical classification and fuzzy logic", 4th Nordic Workshop in Power & Industrial Electronics, Jun. 2004, 5 pages.

Carl S. Byington, P.E., et al., "In-Line Health Monitoring System for Hydraulic Pumps and Motors", 2003 IEEE, 9 pages.

Kai F. Goebel, "Conflict Resolution Using Strengthening and Weakening Operations in Decision Fusion", Proceedings of the 4th Annual Conference on Information Fusion, Fusion 2001, pp. ThA1-19-ThA1-25, 2001.

Sanket Amin, et al., "Fuzzy Inference and Fusion for Health State Diagnosis of Hydraulic Pumps and Motors", AFDDPS-NAFIPS, Jun. 2005, 6 pages.

B.P. Lathi, "Linear Systems and Signals", 1992, Berkeley-Cambridge Press, p. 574-580.

Chinmaya Kar, et al., "Severity Analysis Apparatus and Method for Shafts of Rotating Machinery", U.S. Appl. No. 13/166,205, filed Jun. 22, 2011.

Chinmaya Kar, "Rule-Based Diagnostics Apparatus and Method for Rotating Machinery", U.S. Appl. No. 13/166,524, filed Jun. 22, 2011.

(56) References Cited

OTHER PUBLICATIONS

International Search Report dated Dec. 9, 2010 in connection with International Patnt Application No. PCT/US2010/028258.
Written Opinion of the International Searching Authority dated Dec. 9, 2010 in connection with International Patnt Application No. PCT/US2010/028258.
"Efficient Vibration Condition Assessment, Methodology Overview", DLI Engineering Corporation, 2002, 2 pages.
"ALERT Process Data Logger, Machine Performance Monitoring for Machine Condition Analysis", DLI Engineering Corporation, 2008, 2 pages.
Alan Friedman, "Automated Bearing Wear Detection", Published in Vibration Institute Proceedings 2004, 10 pages.
"SprintMAX, Online Monitoring & Diagnostic System", DLI Engineering Corporation, 2005, 8 pages.
"DLI Watchman PR-1/PR-2, Vibration Precision Reference Calibrators", DLI Engineering Corporation, 2007, 2 pages.
Simon G. Braun, "The Signature Analysis of Sonic Bearing Vibrations", IEEE Transactions on Sonics and Ultrasonics, vol. SU-27, No. 6, Nov. 1980, pp. 317-327.
Y. Gao et al., "Wavelet-Based Pressure Analysis for Hydraulic Pump Health Diagnosis", Transactions of the ASAE, vol. 46(4), pp. 969-976.
Horch A, "A Simple Method for Detection of Stiction in Control Valves", Control Engineering Practice, Pergamon Press, Oxford, GB, vol. 7, 1999, pp. 1221-1231.
Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.
Fujun He et al. "WPT-SVMs Based Approach for Fault Detection of Valves in Reciprocating Pumps", Proceedings of the American Control Conference, Anchorage, AK, May 8-10, 2002, pp. 4566-4570.
Mallat et al., "Singularity Detection and Processing with Wavelets", Mar. 1992, IEEE Transactions on Information Theory, vol. 38, No. 2, pp. 617-643.
Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.
Gao et al., "Support Vector Machines Based Apprroach for Fault Diagnosis of Valves in Reciprocating Pumps", 2002 IEEE Canadian Conference, pp. 1622-1627.
Ren et al., "Fault Feature Extracting by Wavelet Transform for Control System Fault Detection and Diagnosis", 2000 IEEE, International Conference on Control Applications, pp. 485-489.
International Search Report for PCT/US2004/038766, issued by the International Searching Authority, mailed Apr. 14, 2005, by the European Patent Office, P.B. 5818 Patentlaan 2, NL -2280 HV Rijswijk.
Parvez S. et al., "A Wavelet-Based Multi-Resolution PID Controller", 2003 IEEE Conference, Salt Lake City, UT, Oct. 2003, vol. 3 of 3, Conf. 38, pp. 1-5.
Zhihan Xu et al., "Design of-Fault Detection and Isolation Via Wavelet Analysis and Neural Network", 2002 IEEE International Symposium, Vancouver, Canada, Oct. 2002, pp. 467-472.
Song Zhihuan et al., "Adaptive Predictive Control Based on Wavelet Approximation Models", IEEE Conference, Beijing China, Oct. 1996, vol. 2, pp. 820-824.
Xiaohua Xia et al., "Nonlinear Adaptive Predictive Control Based on Orthogonal Wavelet Networks", Shanghai China, Jun. 2002, vol. 1, pp. 305-311.
Nounou M N et al., "Multiscale Fuzzy System Identification", Journal of Process Control, Oxford, GB, vol. 15, No. 7, Oct. 2005, pp. 763-770.
Billings S A et al., "Discrete Wavelet Models for Identification and Qualitative Analysis of Chaotic Systems", Singapore, SG, vol. 9, No. 7, Jul. 1999, pp. 1263-1284.
A. R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.
Chinmaya Kar, et al., "Monitoring gear vibrations through motor current signature analysis and wavelet transform", Mechanical System and Signal Processing 20 (2006), p. 158-187.
Notification of Transmittal of the International Search Report and the Written Opinion of the International Searching Authority, or the Declaration dated Dec. 7, 2011 in connection with International Patent Application No. PCT/US2011/038856.
"The Technology of ExpertALERT, Intelligent Machine Condition Assessment Software", DLI Engineering Corporation, 2007, 4 pages.
European Search Report dated Jun. 5, 2013 in connection with European Patent Application No. EP 13 15 2605.
Michael S. Johnson Jr., "Vibration Tests for Bearing Wear", ASHRAE Journal, Oct. 2000, p. 52-56.
P. Vecer, et al., "Condition Indicators for Gearbox Condition Monitoring Systems", Acta Polytechnica, vol. 45, No. Jun. 2005, p. 35-43.
Ian Howard, "A Review of Rolling Element Bearing Vibration Detection, Diagnosis and Prognosis", Oct. 1994, 109 pages.
Alan Friedman, "Automated Bearing Wear Detection", 2004, 10 pages.
James C. Robinson, et al., "Description of Peakvue and Illustration of its Wide Array of Applications in Fault Detection and Problem Severity Assessment", Emerson Process Management Reliability Conference 2001, Oct. 22-25, 2001, 97 pages.

\* cited by examiner

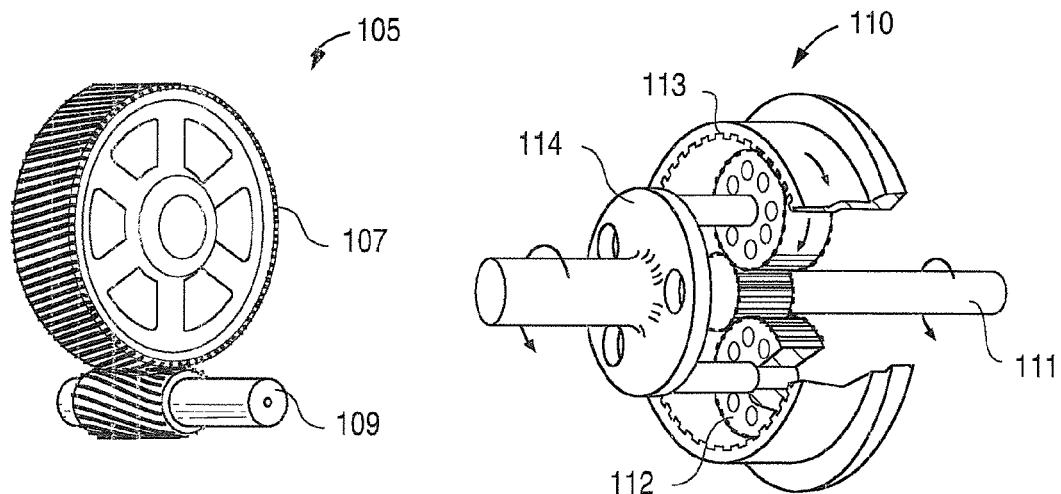
FIG. 1A
(PRIOR ART)
FIG. 1B
(PRIOR ART)
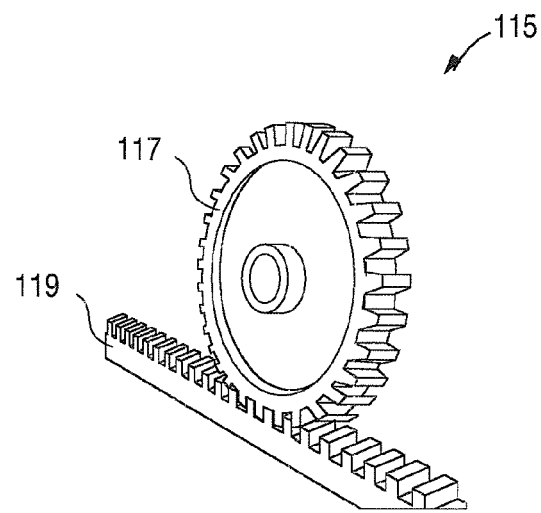
FIG. 1C
(PRIOR ART)

ADHESIVE WEAR

ABRASIVE WEAR

FATIGUE WEAR

CHEMICAL WEAR

SYSTEM AND METHOD FOR BLIND FAULT DETECTION FOR ROTATING MACHINERY

TECHNICAL FIELD

This disclosure relates generally to rotating devices. More specifically, this disclosure relates to a system and method for blind fault detection for rotating machinery.

BACKGROUND

Gearboxes are omnipresent components in many industries. Gearboxes often include speed reduction and power transmission components. A gearbox can be a single-stage gearbox or a multi-stage gearbox. A gearbox could also represent or include external gearing, internal gearing, or rack and pinion gearing.

Because of this wide use, many industries are concerned with equipment failures. For example, one survey found that gearbox failures account for 34% of all failure modes (such as fatigue) in aircraft. Another survey revealed that gearbox failures account for 15% of all failures in a certain industry. Equipment failures typically result in lost revenues due to plant downtime. Accordingly, detecting potential failures (such as faults) in a gearbox or other equipment at an early stage can assist in preventing secondary damage, save maintenance costs, improve plant uptimes, reduce potential financial losses from plant downtime, and assist towards increasing productivity.

SUMMARY

This disclosure provides a system and method for blind fault detection for rotating machinery.

In a first embodiment, an apparatus includes an input interface configured to receive an input signal associated with at least one stage of rotating equipment. The apparatus also includes a processing unit configured to identify a fault in the rotating equipment using the input signal. The apparatus further includes an output interface configured to provide an indicator identifying the fault. The processing unit is configured to identify the fault by determining at least one family of frequencies related to at least one sensor point, determining an average energy for the at least one sensor point based on the at least one family of frequencies, and comparing the average energy to a baseline value.

In a second embodiment, a system includes one or more sensors configured to measure one or, more characteristics of rotating equipment and a blind fault detection device. The blind fault detection device includes an input interface configured to receive at least one input signal from the one or more sensors. The blind fault detection device also includes a processing unit configured to identify a fault in the rotating equipment using the at least one input signal. The blind fault detection device further includes an output interface configured to provide an indicator identifying the fault. The processing unit is configured to identify the fault by determining at least one family of frequencies related to at least one sensor point, determining an average energy for the at least one sensor point based on the at least one family of frequencies, and comparing the average energy to a baseline value.

In a third embodiment, a method includes receiving an input signal associated with at least one stage of rotating equipment. The method also includes identifying a fault in the rotating equipment using the input signal. The method further includes providing an indicator identifying the fault. Identifying the fault includes determining at least one family of frequencies related to at least one sensor point, determining an average energy for the at least one sensor point based on the at least one family of frequencies, and comparing the average energy to a baseline value.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 1A through 1D illustrate example gear structures;

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. Also, it will be understood that elements in the figures are illustrated for simplicity and clarity and have not necessarily been drawn to scale. For example, the dimensions of some elements in the figures may be exaggerated relative to other elements to help improve the understanding of various embodiments described in this patent document.

FIGS. 1A through 1D illustrate example gear structures. The embodiments of the gear structures shown in FIGS. 1A through 1D are for illustration only. Other gear structures could be used without departing from the scope of this disclosure.

Figure 1D:
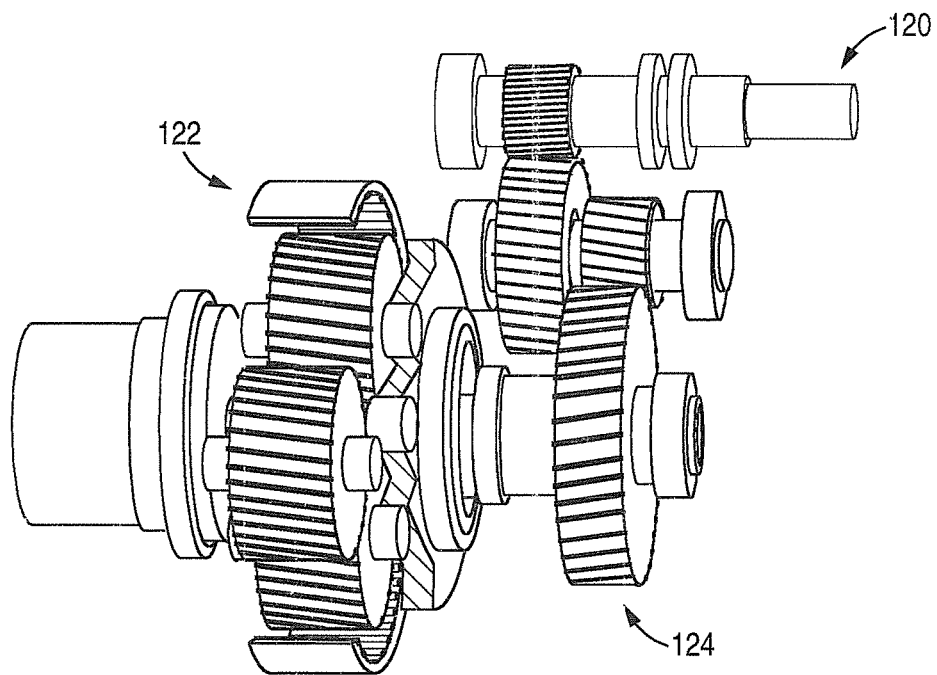
Figure 1E:
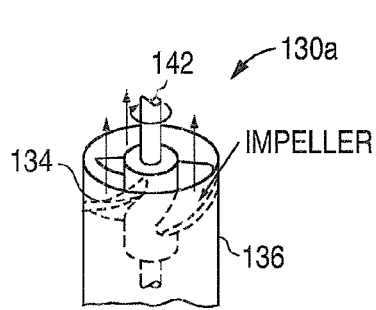
FIGS. 1E through 1K illustrates example impeller configurations.
Figure 1F:
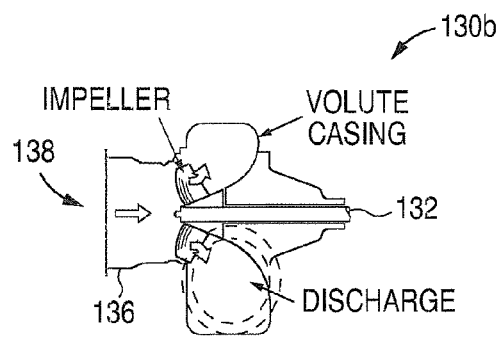
Figure 1G:
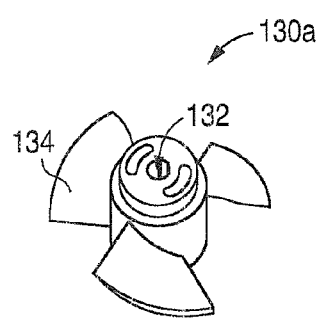

A gearbox can include one or more types of gears, such as external gearing 105 (FIG. 1A), internal gearing 110 (FIG. 1B), and rack and pinion gearing 115 (FIG. 1C). A gearbox can be a single-stage gearbox (as shown in FIGS. 1A through 1C) or a multi-stage gearbox 120 (as shown in FIG. 1D).

The external gearing 105 illustrated in FIG. 1A is a helical gear. Here, the external gearing 105 is a single stage that includes a gear 107 and a pinion 109. However, other embodiments, such as those where the external gearing 105 is a spur gear, could also be used.

The internal gearing 110 illustrated in FIG. 1B is also a single-stage gearing structure. The internal gearing 110 includes a sun gear 111, a planet gear 112, a ring gear 113, and a planet carrier 114.

The rack and pinion gearing 115 illustrated in FIG. 1C is again a single-stage gearing structure. The rack and pinion gearing 115 includes a pair of gears 117, 119 that converts rotational motion into linear motion. The circular pinion 117 engages teeth on the rack 119. Rotational motion applied to the pinion 117 causes the rack 119 to move to the side, up to the limit of its travel. For example, in a railway, the rotation of a pinion 117 mounted on a locomotive or a railcar engages a rack 119 between the rails and pulls a train along a steep slope.

The multi-stage gearbox 120 illustrated in FIGURE in includes a first stage 122 and a second stage 124. It will be understood that illustration of two stages is for example purposes only. Embodiments of the multi-stage gearbox 120 including more than two stages could also be used. In this example, the first stage 122 is configured as an internal gearing, and the second stage 124 is configured as an external gearing. As such, the first stage 122 is representative of a single-stage internal gearbox, and the second stage 124 includes several gears and pinions coupled to form a multi-stage external gearing.

A fault, or failure, may occur in a gearbox formed using any one or more of the gear types described above or other gear types. The failure can occur in a gear, a pinion, or both. Gear failures include wear, cracking, tooth breakage, static and dynamic transmission error, plastic flow, scoring and scuffing, surface fatigue, spalling, and backlash.

FIGS. 1E through 1K illustrates example impeller configurations. In FIGS. 1E through 1K, impellers 130a-130b include a rotor inside a cylinder, tube, or other conduit. The rotor is used to increase the pressure and flow of a fluid inside the conduit. The conduit includes an open inlet 138 (often referred to as an "eye") that accepts incoming fluid. Vanes 134 push the fluid radially within the conduit 136. The vanes 134 can, for example, represent backward curved blades 134a, radial blades 134b, or forward inclined blades 134c. A splined, keyed, or threaded bore 132 accepts a driveshaft 142, which causes the vanes 134 to rotate. The impellers 130a-130b can be made of iron, steel, bronze, brass, aluminum, plastic, or other suitable material(s). The impeller 130a represents an axial flow impeller, and the impeller 130b represents a mixed flow impeller.

Figure 1J:
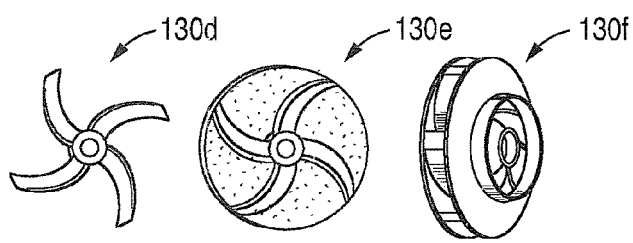
Figure 1H:
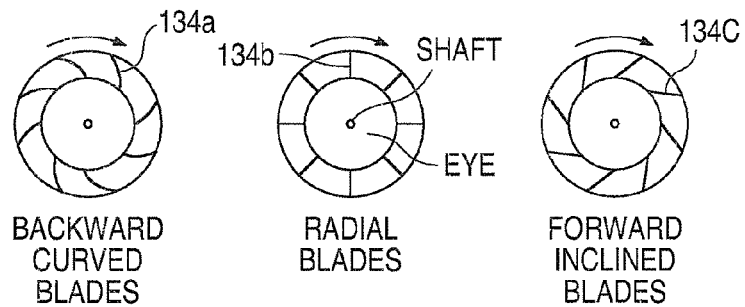
Figure 1I:
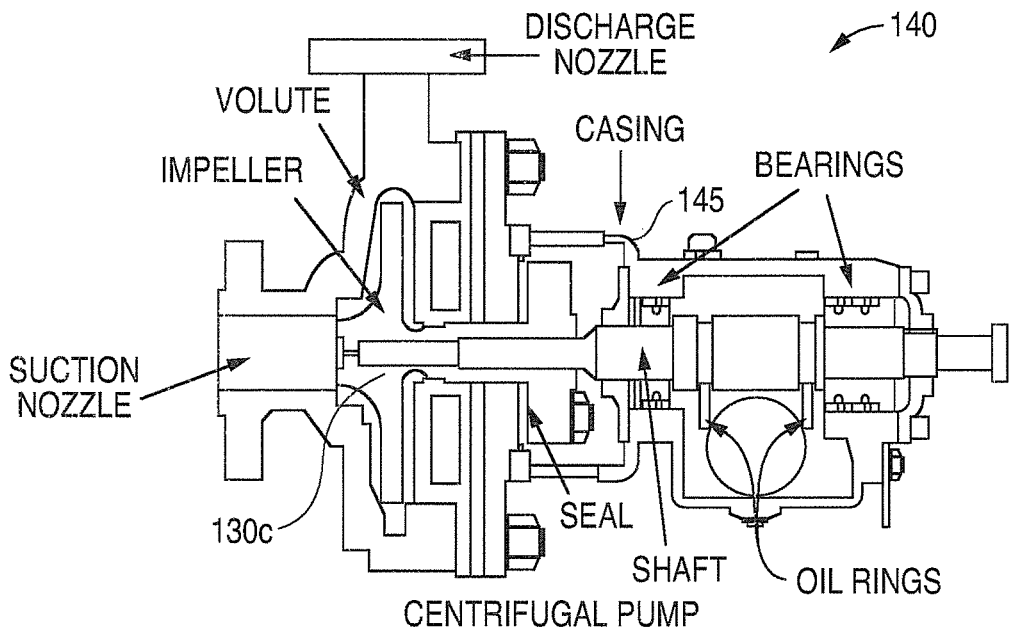
Figure 1K:
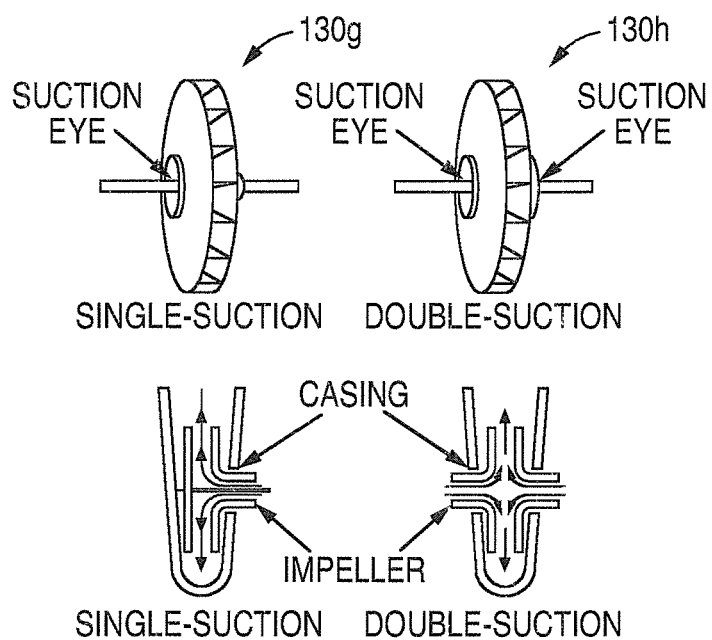

As shown in FIG. 1I, an impeller 130c also can be used as the rotating component of a centrifugal pump 140. The impeller 130c transfers or converts rotating and/or kinetic energy from a motor that drives the pump 140 into potential energy of the pumped fluid by accelerating the fluid outwards from the center of rotation. The velocity achieved by the impeller 130c translates into pressure when a pump casing 145 confines the outward movement of the fluid.

FIGS. 1J and 1H illustrate additional types of impellers. In particular, FIG. 1J illustrates an open impeller 130d, a semi-open impeller 100e, and a closed impeller 130f. FIG. 1H illustrates a single suction impeller 130g and a double suction impeller 130h.

In addition to selecting a particular type of impeller, the design of the particular impeller can be varied to alter its performance characteristics. For example, an impeller with a large number of vanes or with vanes having large angles may have an increased "head" of the fluid. Also, an impeller with a low number of vanes or with large vane outlet angles may have poor vibration characteristics or heavy loads at the tips. Further, a larger clearance between an impeller and its casing may decrease vibration but result in an increase in size, weight, and cost.

Although only a few gear types have been illustrated here, many other gear types could be used. Other gear types can include, but are not limited to, gearboxes with parallel shafts, intersecting shafts, and/or non-intersecting and non-parallel shafts. Parallel shafts can include spur gears, single helical gears, and double helical gears. Intersecting shafts can include bevel gears, coniflex bevel gears, zerol bevel gears, spiral bevel gears, miter gears, angular gears, and crown gear's. Non-intersecting and non-parallel shafts can include crossed helical gears, hypoid gears, and worm gears. In addition, although a gearbox is illustrated by example here, other types of rotating machines could be monitored as described below. For example, a monitored rotating machine can include an impeller or a pump.

Rotating machines, such as gearboxes, can include multiple configurations. These configurations can include:

1. Different bearing numbers or bearing geometries, like pitch circle diameter, ball diameter, number of balls, and contact angle at each measurement points;

2. Different numbers of stages of gears, and different numbers of teeth in the gears and pinions at each stage; and 3. Different numbers of stages of impellers, and different numbers of vanes at each stage and the like.

The configuration of a particular machine may not be available, such as when the machine is very old and information about its configuration is missing. Also, a person who has installed or maintained the machine may not be available. The configuration may also be unavailable because one or more of the machine's subsystems (such as bearings, gears, and so forth) are changed too often such that there is a chance that the maintenance personnel may have replaced it with another make or model. Further, as a result of emergency maintenance, a subsystem may have been replaced with a non-standard subsystem.

The configuration of a machine may be needed to carry out exact fault classification using first principles. Also, the configuration of a machine enables a determination of the defect of a bearing at the exact point since the configuration information of bearings at all points are known. Thus, repair time can be shortened by ensuring that maintenance personnel will not disassemble a whole machine but will replace only the defective bearing. Furthermore, the configuration may be needed to formulate mathematical models so as to simulate any behavior of the machine and so forth.

Figure 2A:
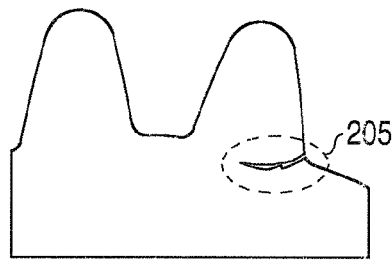
FIGS. 2A through 2E illustrate example cracks and wear experienced by gears.
Figure 2B:
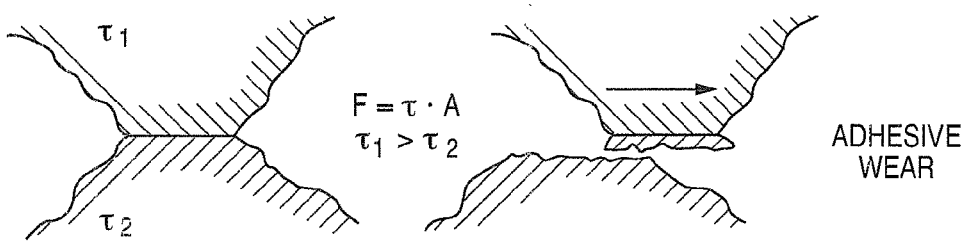
Figure 2C:
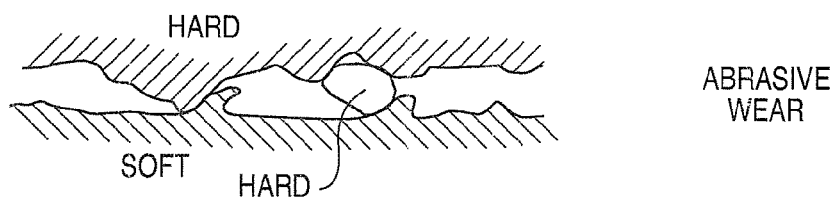
Figure 2D:
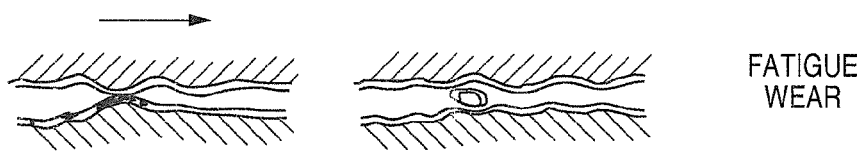
Figure 2E:
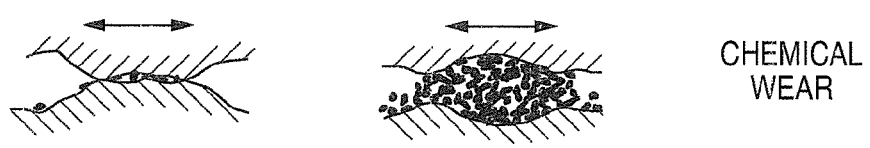

FIGS. 2A through 2E illustrate example cracks and wear experienced by gears. FIG. 2A illustrates a fatigue crack 205. The fatigue crack 205 can lead to teeth breakage. Teeth breakage includes fatigue breakage, breakage due to heavy wear, and overload breakage. FIG. 2B illustrates an example of adhesive wear. FIG. 2C illustrates an example of abrasive wear. FIG. 2D illustrates an example of fatigue wear. FIG. 2E illustrates an example of chemical wear. These types of cracks and wear can be detected using the system described below. However, many other or additional types of damage also can be detected using the system described below.

In accordance with this disclosure, a system and method are provided that can identify and classify (e.g., isolate) one or more types of defects occurring on a rotating device. Moreover, this can be accomplished without having information defining the exact configuration of the rotating device.

Figure 3:
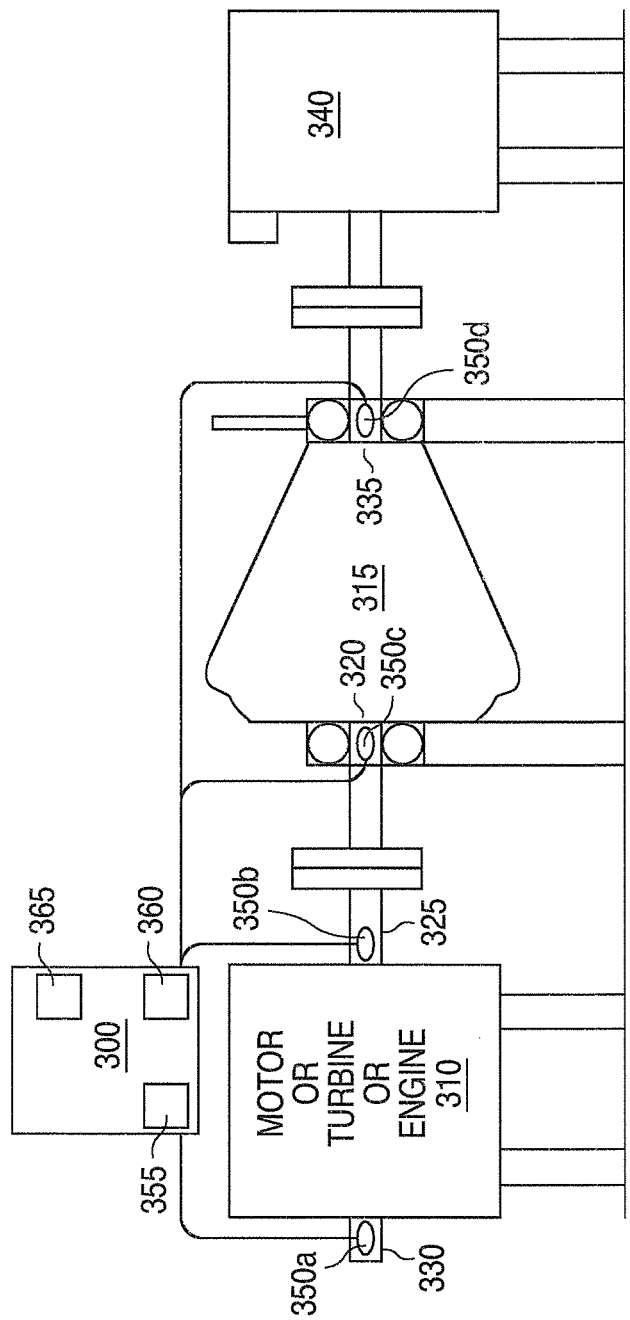
FIG. 3 illustrates an example Blind Fault Detection (BET) device and an associated rotating machine system according to this disclosure.

FIG. 3 illustrates an example Blind Fault Detection (BFD) device 300 and an associated rotating machine system 305 according to this disclosure. This use of the BFD device 300 is for illustration only. The BFD device 300 could be used in any other suitable manner without departing from the scope of this disclosure.

In this example, the rotating machine system 305 includes a rotating component 310 (such as a motor, turbine, or engine) and a gearbox 315. Although the example of the rotting machine system 305 includes a gearbox 315, other devices could be included, such as a fan, pump or compressor.

As a specific example of the system shown in FIG. 3, an automotive transmission gearbox 315 can be coupled on a drive end (DE) 320 to a drive end 325 of an induction motor 310, which also includes a non-drive end (NDE) 330. The gearbox 315 can be coupled on a non-drive end 335 to a mechanical load unit 340. Various probes 350a-350d are coupled to the non-drive end 330 and drive end 325 of the induction motor 310 and to the non-drive end 335 and the drive end 320 of the gearbox 315. The probes 350a-350d measure one or more characteristics of the system 305, such as vibration, motor current, noise, or speed of the gearbox 315 and motor 310. In particular embodiments, each of the probes 350a-350d can include three sensors configured to provide measurements in three orientations: horizontal, vertical, and axial.

The BFD device 300 can identify and classify defects in the rotating machine system 305 without having information regarding the configuration of the rotating machine system 305. The BFD device 300 can monitor the rotating machine system 305 by monitoring various Families of Frequencies (FoFs) using shaft and non-synchronous energy, baseline energy, and a multi-sensor system. The various Families of Frequencies include, but are not limited to, shaft frequencies and non-synchronous harmonics. The multi-sensor system can provide a point indicator by applying a minimum of two sensors at two locations for measuring energy at these points and monitoring the energy with respect to a baseline in order to determine what incurs an energy increase. The multi-sensor system can also include at least three sensors per monitoring point to provide a single value point by multi-sensor fusion. A Point Health Degradation indicator can provides four values per system 305 and can focus on only the point where attention is required. It can also provide a single value per orientation by multi-sensor fusion. An Orientation Health Degradation indicator can provide three values per system 305 to focus on certain failure modes.

Some blind fault detection systems employ a scheme to track energy in different frequency bands in a vibration frequency domain. However, such schemes are limited to detecting bearing vibrations. Some blind fault detection systems establish limits in the frequency domain peaks and track if the limits are exceeded. However, such systems provide relative thresholds in the frequency domain of a baseline spectrum. A warning alert may come when the current amplitude at a specified frequency exceeds twice its value. Similarly, an alarm alert may be given when the amplitude exceeds ten times its value. Some blind fault detection systems use either the root mean square (RMS) or peak amplitude and has certain thresholds depending on the class of the machine and type of foundation (flexible or rigid). However, these methods of blind fault detection fail to provide any information of defects at a point and fail to detect the defect in the presence of the sensors (accelerometers) at various points of measurement in the machine. These methods also cannot be automated, as they require an operator for configuring frequency bands and finding a defect at any point or band.

In some embodiments, the BFD device 300 is configured to consider three parameters in a vibration. The three parameters include synchronous energy; non-synchronous energy, and shaft energy, which can be a combination of low frequency synchronous and non-synchronous, components. The BFD device 300 can find the change in these energies with respect to a baseline energy. The baseline energy can be taken from a vibration spectrum pertaining to normal operation. In some embodiments, the BFD device 300 computes an average of these energy levels at different points of measurement for a particular operation. The BFD device 300 also tracks if the energy at a particular point and orientation is more than the average energy at that orientation. The BFD device 300 then finds a rule-based or fuzzy rule-based diagnostic for specifying some sort of classification.

A synchronous energy increase can be due to various factors, such as a shaft, impeller, or gear of a particular stage of a multi-stage gearbox (if the shaft speed of the first stage is considered in the analysis). A shaft energy change can validate if the shaft is defective. A non-synchronous energy increase can also be due to various factors, such as a, bearing at a particular point, gears at stages other than the stage for which speed has been measured, and a natural frequency/resonance.

The BFD device 300 includes logic configured to detect the exact point where a fault might have started. After determining the point where the fault started, the BFD device 300 can provide one or various indicators. For example, point health can let an operator know about the point of measure that is the source of a fault. A non-synchronous indicator can convey information of the source of the fault at a bearing or gear near to a point. A synchronous indicator can convey information of the source of the fault at an impeller, gear, or shaft to a point. A shaft indicator can confirm if a rise of the synchronous indicator is a result of a shaft or another component.

In some embodiments, one of three methods can be utilized for blind fault detection. An orientation-wise method can be used to find an orientation-wise average, and a point-wise method can be used to find a point-wise average. Additionally, a third method includes both point-wise and orientation-wise indicators. These three methods are described below.

The BFD device 300 includes any suitable structure for identifying faults in rotating equipment. In this example, the BFD device 300 includes at least one processing unit 355, at least one memory 360, and at least one input/output interface 360. The at least one processing unit 355 includes any suitable device or system for processing data to identify faults in rotating equipment. The at least one processing unit 355 could, for instance, include at least one processor, microprocessor, microcontroller, field programmable gate array (FPGA), application specific integrated circuit (ASIC), or other processing or control device. The at least one memory 360 stores and facilitates retrieval of data used, generated, or collected by the BFD device 300. The at least one memory 360 includes any suitable volatile and/or non-volatile storage and retrieval device(s). The at least one input/output interface 360 facilitates interaction with external devices, systems, or operators. For instance, the at least one input/output interface 360 could include an input interface for receiving data from an operator or from the sensors 350a-350d. The at least one input/output interface 360 could also include an output interface for outputting alarms, warnings, or other data to an operator display or external system.

Figure 4A:
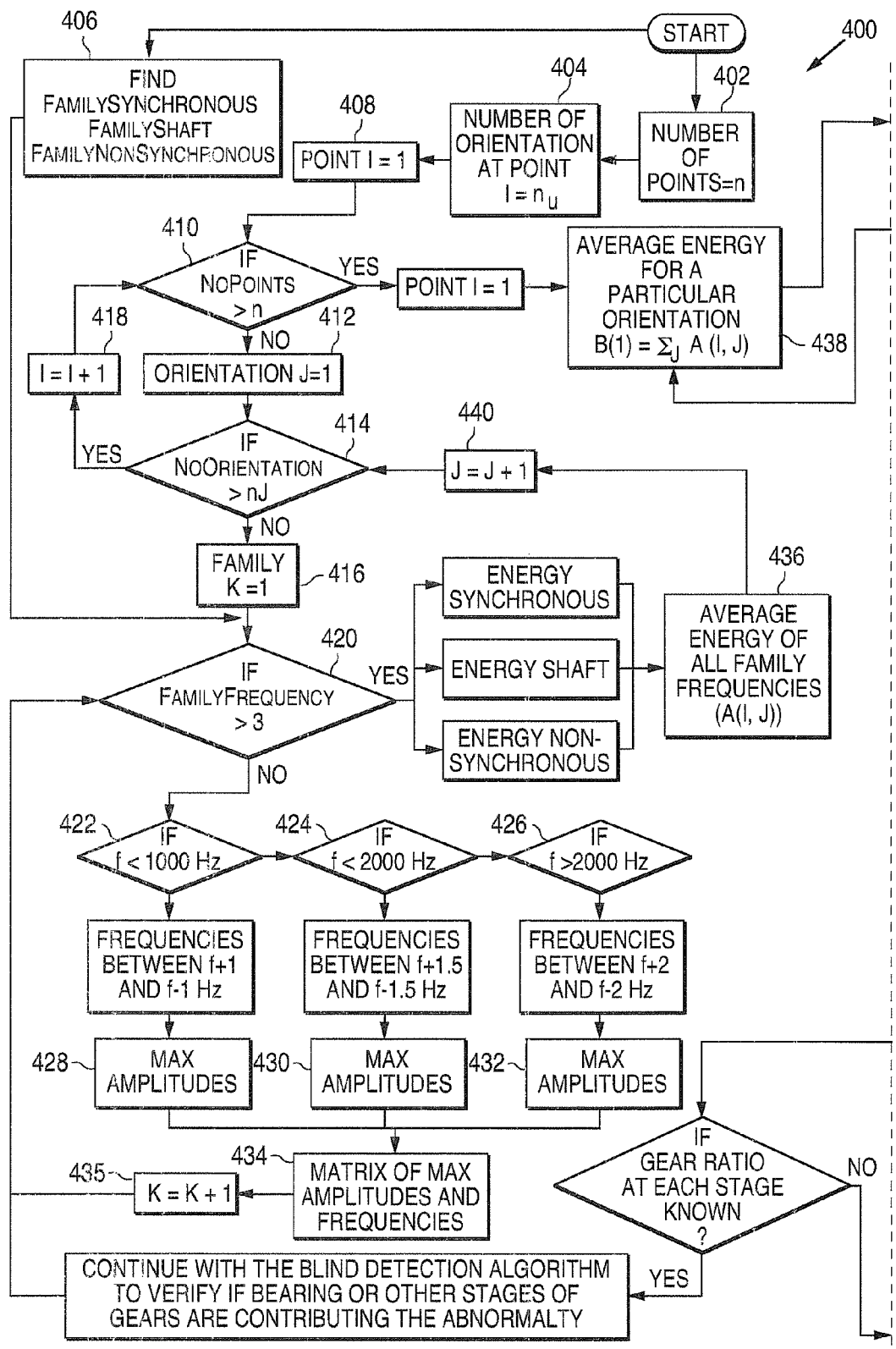
FIG. 4 illustrates an example point-wise method for blind fault detection according to this disclosure.
Figure 4B:
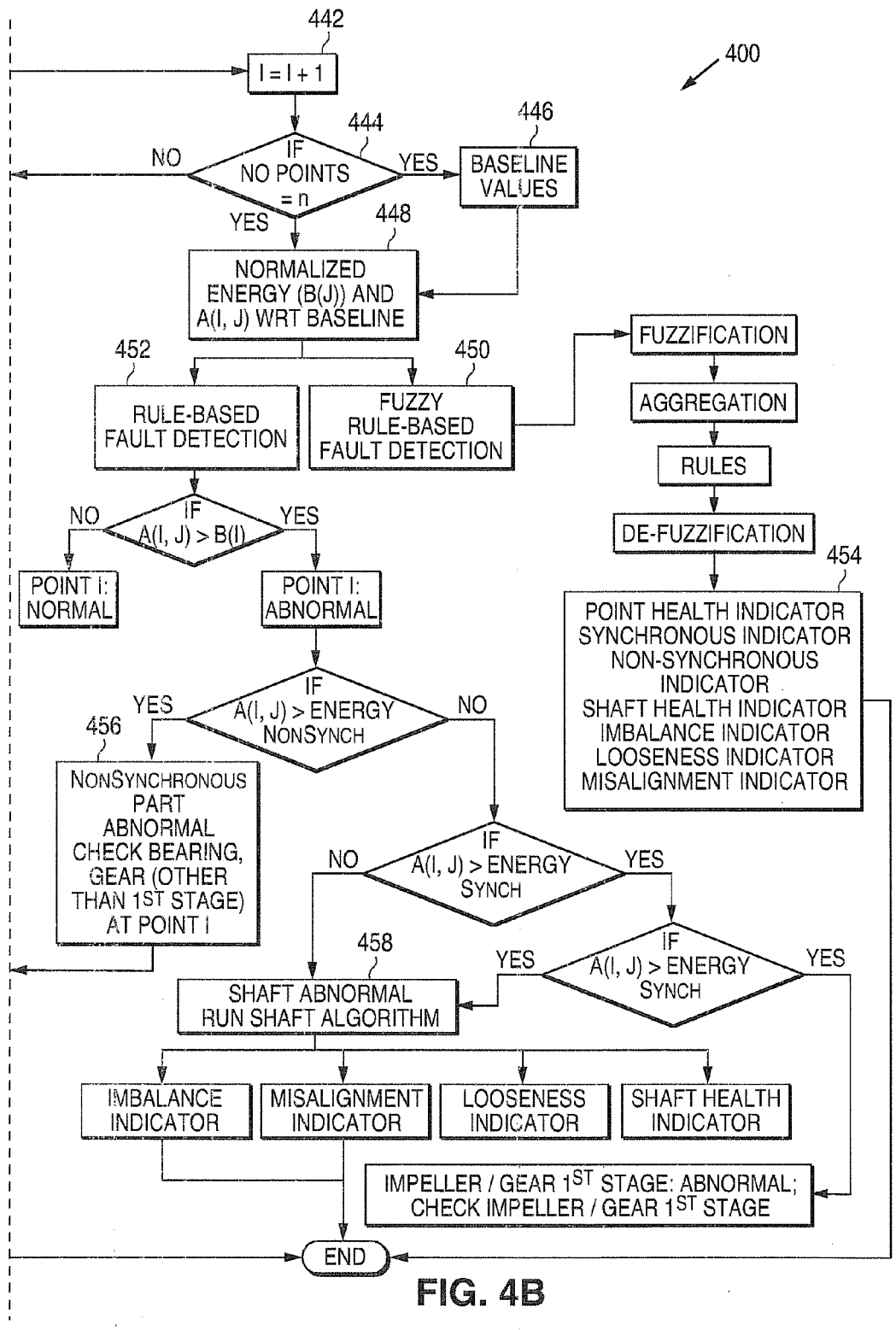

FIG. 4 illustrates an example point-wise method 400 for blind fault detection according to this disclosure. The embodiment of the BFD method 400 shown in FIG. 4 is for illustration only. Other embodiments could be used without departing from the scope of this disclosure.

In the first method 400, A(I,J) is averaged for all orientations (J), giving rise to B(I) energy at each point I. For example, a non-drive end of a motor (Point 1) has measurements for two orientations, namely horizontal (1H) and vertical (1V). Similarly, a drive end of the motor has measurements for two orientations, namely horizontal (2H) and vertical (2V). Averaging these features point-wise yields B(1) and B(2), respectively. Therefore, an operator can focus repair efforts based on the portion with the higher energy. Even if two points have bearings with the same configuration, the defective bearing can be easily pinpointed because the non-synchronous energy in such case is very high for that point at some orientations, and the failure of coupling can be detected easily by looking at the synchronous energy of these two points.

In blocks 402 and 404, an operator inputs the number of points of measurement in a machine, as well as the number of orientations at each point of measurement. For example, Motor Non-Driving End (MNDE), Motor Driving End (MDE), Pump Driving End (PDE), and Pump Non-Driving End (PNDE) are four points of measurements. At each point, there may be one, two or three orientations of measurement, such as horizontal, vertical, and axial. The measurements can include vibration (or acoustics) and speed. The speed measurements can include:

a single speed measurement for all portions of the shaft, so fault isolation is good if the speed ratio is available (for the case of gear/belt/chain transmission); and speed measurements for each shaft (no speed ratio is required).

In block 406, families of frequencies for synchronous, shaft, and non-synchronous indicators are identified. Also, a vibration spectrum is monitored in each orientation of each point. For example, in block 408, a counter initializes a Point I=1. In block 410, the BFD device 300 determines if I>n. If I≤n, an orientation counter initializes an orientation J=1 in block 412. If I>n, the BFD device 300 can set I=1 and proceeds to calculate the average energy for this orientation in block 438. In block 414, the BFD device 300 determines if $J>n_{I,J}$. If $J\le n_{I,J}$, the BFD device 300 initializes a family value K=1 in block 416. Alternatively, if $J>n_{I,J}$, the point value I is incremented to the next point in block 418.

Three families of frequencies are then analyzed using speed information. The families of frequencies are:

Synchronous family: The family of harmonics of shaft speed is known as synchronous, where the numbers of harmonics are determined by the ratio of the maximum frequency content and the shaft speed. The maximum frequency information can be provided by the user or automatically taken from sampling frequency information as:

$$F_{max} = \frac{f_s}{2}$$

Non-synchronous family: The set of frequencies other than the synchronous frequency is considered as the non-synchronous family of frequencies.

Shaft family: A shaft defect excites frequencies from 1×-6×. Moreover, looseness of the shaft excites frequencies of 0.5×, 1.5×, 2.5× and 3.5×. The union of these frequencies is considered as the shaft family of frequencies.

The amplitudes of the families of frequencies are determined by taking small bands of 1.5 Hz for a frequency band of 0-1 kHz (block 422), 1.5 Hz for a frequency band of 1-2 kHz (block 424), and 2 Hz for a frequency band above 2 kHz (block 426). The maximum amplitudes of these bands are determined in blocks 428, 430, and 432. A matrix is formed of the maximum amplitudes and their frequencies in block 434. This process is repeated for each family of frequencies. That is, the family K is set to K+1 in block 435. Once the families of frequencies for each of the three families has been determined (i.e., familyoffrequency>3 in block 420), the synchronous energy, shaft energy and non-synchronous energy are utilized to compute the average energies in block 436.

The energy can be determined by finding the norm (summing the squares of the amplitudes) or the RMS. The energies in all families each point are averaged (Block 436). Then, the next orientation is repeated for finding the average energy till the number of orientations exceeds nJ for each point. All energy of the families are averaged to yield A(I,J), where A refers to the averaged energy at point I and orientation J. The energies are obtained from each orientation for block 436 at each point in block 438. That is, when an average of a family of frequencies is computed for a first orientation in block 436, the orientation is incremented to the next orientation in block 440. This process is repeated until the BFD device 300 determines that each orientation has been computed for that point ($J>n_{I,J}$ in block 414). Then, the BFD device 300 increments to the next point in block 418 and computes the family of frequencies for each orientation at that point.

Once the BFD device 300 determines that an orientation for each point has been computed (I>n in block 410), the BFD device 300 computes the average energy for each orientation in block 438. The average orientation can be computed according to:

$$B(I) = \Sigma_J A(I,J)$$

The BFD device 300 determines the baseline values in block 446 when energies from each of the points have been obtained (via the iteration through blocks 442 and 444). In block 448, the BFD device 300 normalizes the energy B(I) and A(I,J) with respect to the baseline values.

Thereafter, the BFD device 300 performs Fuzzy Rule-Based Diagnostics 450 and Rule-Based Diagnostics 452. The Fuzzy Rule-Based Diagnostics 450 include fuzzification, rules, aggregation, and de-fuzzification operations. These functions are described in more detail below in U.S. patent application Ser. No. 12/417,452, the contents of which are incorporated by reference in their entirety.

A Rule-Based Fault detection (block 452) is applied to determine if the average energy at a point and an orientation is normal or abnormal. For example, if A(I,J)>B(I), the BFD device 300 determines that the energy at Point I, Orientation J is abnormal. Alternatively, if A(I,J)≤B(I), the BFD device 300 determines that the energy at Point I, Orientation J is normal. Additionally, in block 454, the BFD device 300 applies a Fuzzy Rule-Based Fault detection to determine one or more of a Point Health indicator, a Synchronous indicator, a Non-Synchronous indicator, a Shaft Health indicator, an Imbalance indicator, a Looseness indicator, and a Misalignment indicator. If an abnormality is detected in block 452, the BFD device 300 compares the average energy to each of the non-synchronous, synchronous, and shaft energies to determine if the gear at point I is abnormal (block 456) or the shaft at point I is abnormal (block 458). If the gear is abnormal and the gear ratio at each station is known, the BFD device 300 continues to compute the family of frequencies at block 420. Otherwise, the process ends. If the shaft at point I is abnormal, the BFD device 300 provides an appropriate indicator for imbalance, misalignment, looseness, shaft health, or impeller/gear indication.

Either fuzzy rule-based diagnostics or simple rule-based diagnostics are applied to get certain health indicators of the machine. Moreover, use cases can be automated using some rules, such as:

The operator can be provided an alarm of a large point health degradation indicator at point 2;

Comparing point 2 with the other points can indicate that the energy at point 2 is much larger than the health indicators of the other points;

The individual orientations of point 2 can be compared to identify if the horizontal or vertical vibration is contributing to the higher energy of the point; and The orientation energy can be analyzed to determine if it is larger because of the synchronous energy, non-synchronous energy, or shaft energy. That is, a large amount of synchronous energy and a smaller amount of shaft energy can suggest that there is a chance of impeller/gear failure, whereas a large amount of non-synchronous energy can reveal that there may be a problem in the bearing or gears of the output shaft. If the bearing at a number of points of measurement are similar, the user can distinguish the exact bearing that is undergoing large degradation by comparing the non-synchronous energy at these points.

Figure 5A:
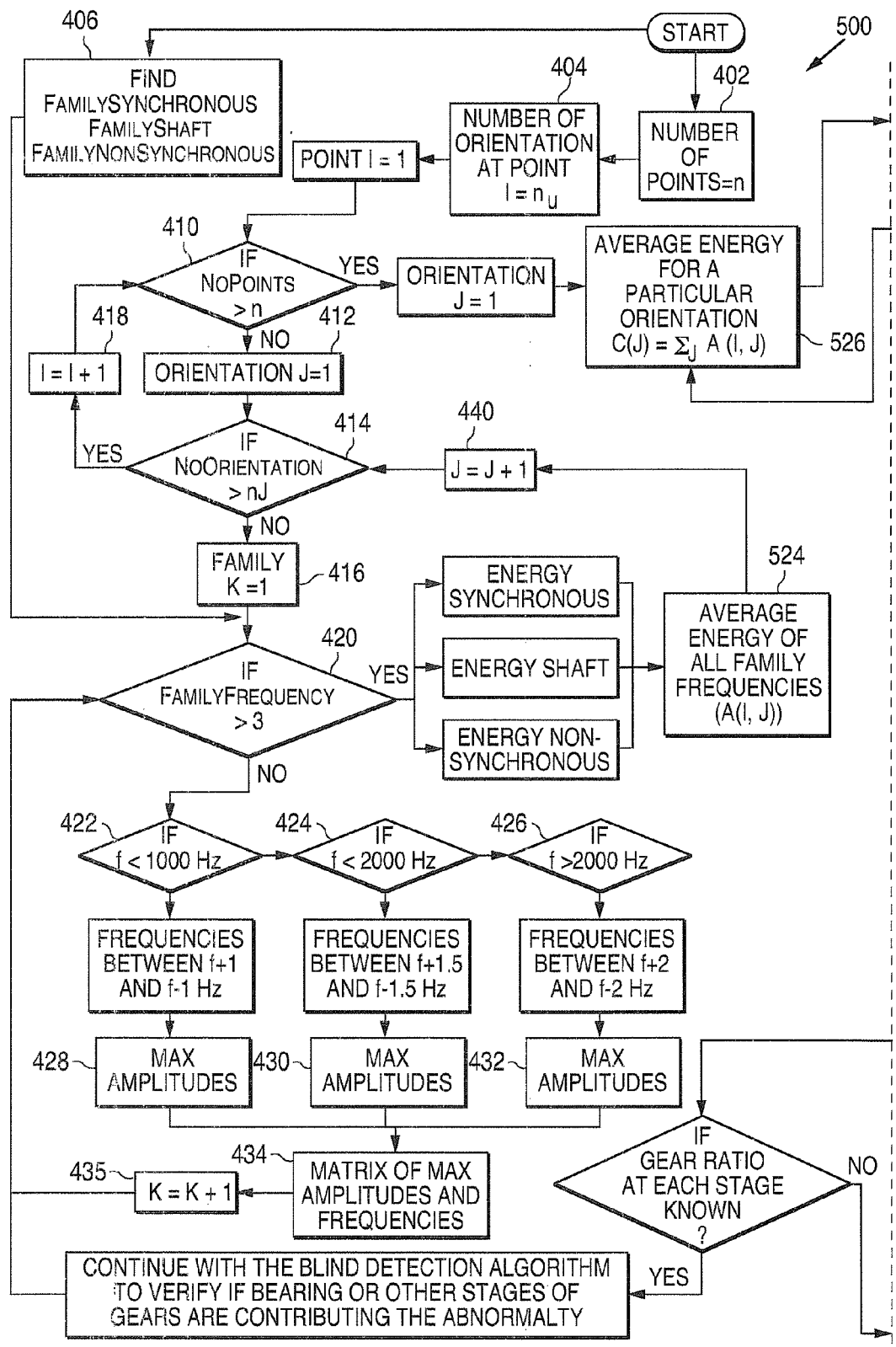
FIG. 5 illustrates an example orientation-wise blind fault detection method according to this disclosure.
Figure 5B:
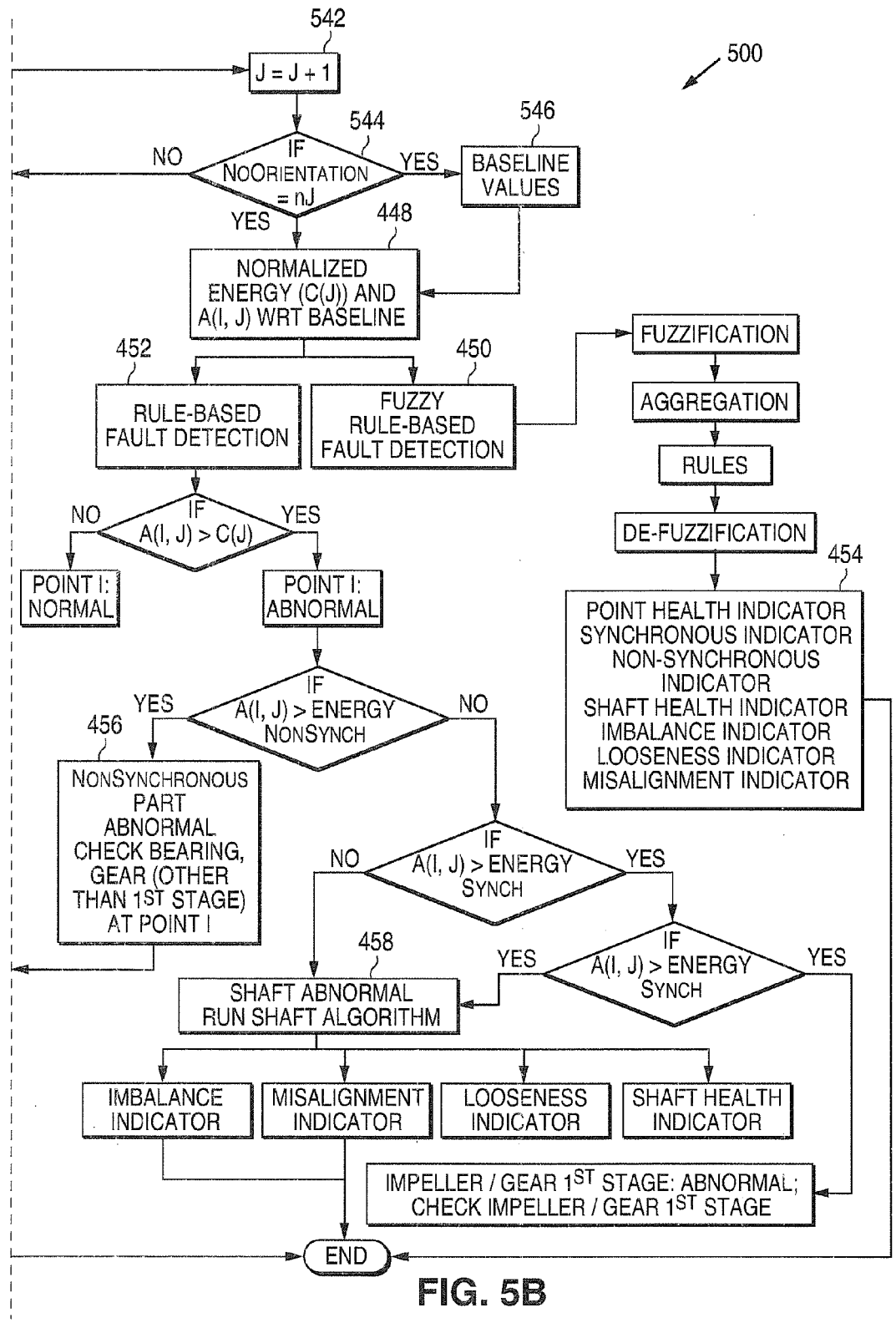

FIG. 5 illustrates an example orientation-wise blind fault detection method 500 according to this disclosure. The embodiment of the method 500 shown in FIG. 5 is for illustration only. Other embodiments could be used without departing from the scope of this disclosure.

In the orientation-wise blind fault detection method 500, A(I,J) is averaged for all points (I) giving rise to B(J) energy at each orientation J. For example, the non-drive end of a motor (Point 1) can have measurements for two orientations, namely horizontal (1H) and vertical (1V). Similarly, the drive end of the motor has measurements for two orientations, namely horizontal (2H) and vertical (2V). Averaging features orientation-wise yields C(H) and C(V), respectively. Therefore, each orientation has certain significance. For example, a large vibration in the horizontal orientation suggests that there is large loading (as the sensor at a horizontal point is nearer the loading zone), whereas a large vertical vibration (at the upper point) suggests that the loading is not proper so there is a rattle of shaft. Additionally, when a large unbalance exists, the vibration at these two orientations can be significantly different. When a misalignment exists, the vertical measurement of one point can be significantly different from the horizontal measurement of the nearest point and vice versa. If the axial vibration is measured, then large axial vibration can suggest large misalignment of a roller/cylindrical bearing or helical gears. Accordingly, even if the configuration of the bearing or gear is not known, an operator can make certain assumptions regarding the gear health.

The orientation-wise blind fault detection method 500 can be substantially similar to the point-wise detection method 400. For example, in blocks 402-404, the operator can input the number of points of measurement in a machine, as well as the number of orientations at each point of measurement. However, the energy in all the families of frequencies for each point (block 524) and orientation (block 526) is calculated by finding either the norm (summing the squares of the amplitudes) or the RMS. All the energy of the families of frequencies are averaged to yield A(I,J), where A refers to the averaged energy at point I and orientation J. In block 526, the average energy for a particular orientation can be determined based on:

$$C(J) = \Sigma_I A(I,J)$$

The BFD device 300 determines the baseline values in block 546 when energies from each of the orientations have been obtained. In block 448, the BFD device 300 normalizes the energy C(J) and A(I,J) with respect to the baseline values. Similar rules can be formulated, and fuzzy rule-based diagnostics or simple rule-based diagnostics can be applied to get certain health indicators of the machine. For example, if A(I,J)>C(J), the BFD device 300 determines that the energy at Point I, Orientation J is abnormal. Alternatively, if A(I,J) ≤C(J), the BFD device 300 determines that the energy at Point I, Orientation J is normal.

Figure 6A:
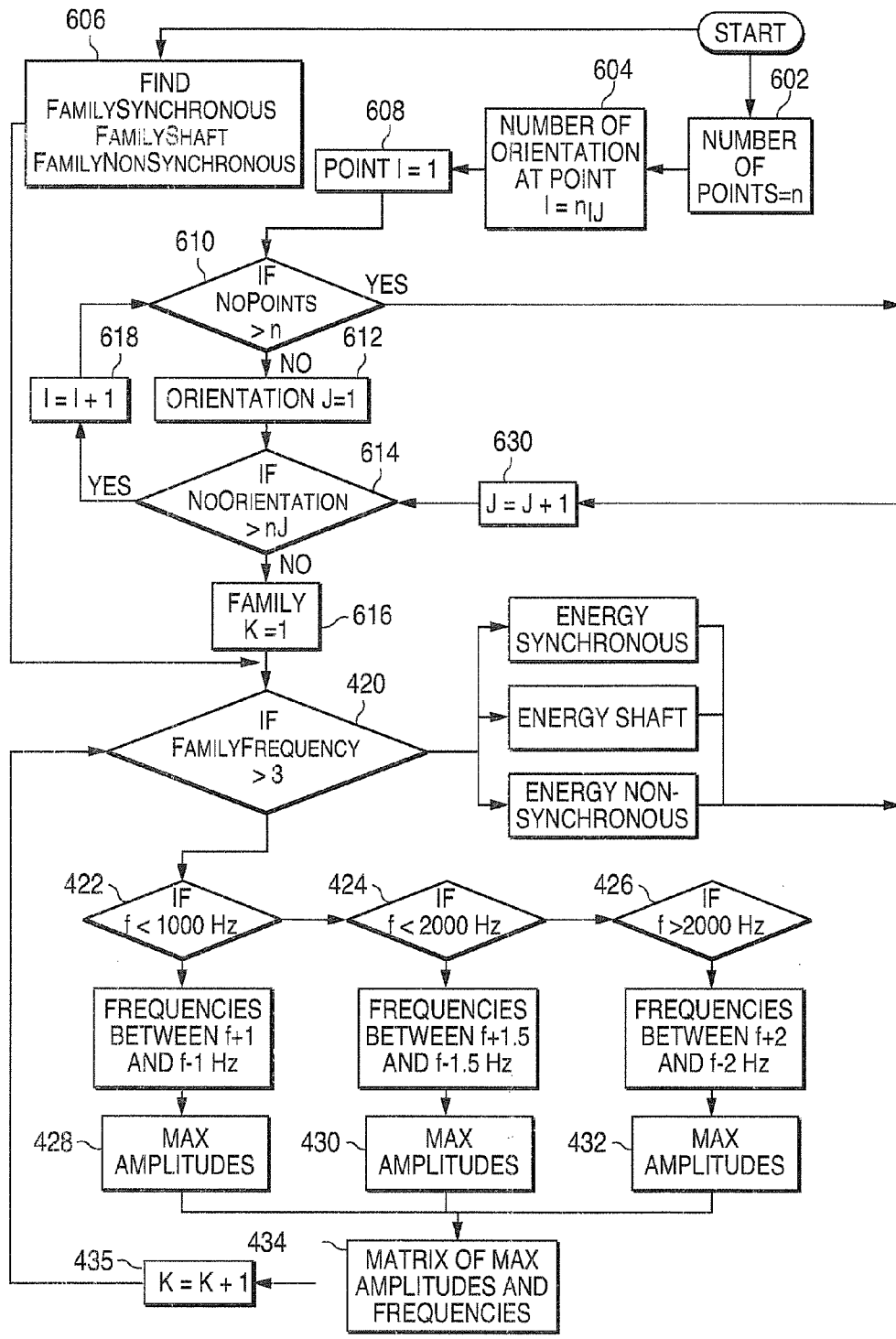
FIG. 6 illustrates an example combined blind fault detection method according to this disclosure.
Figure 6B:
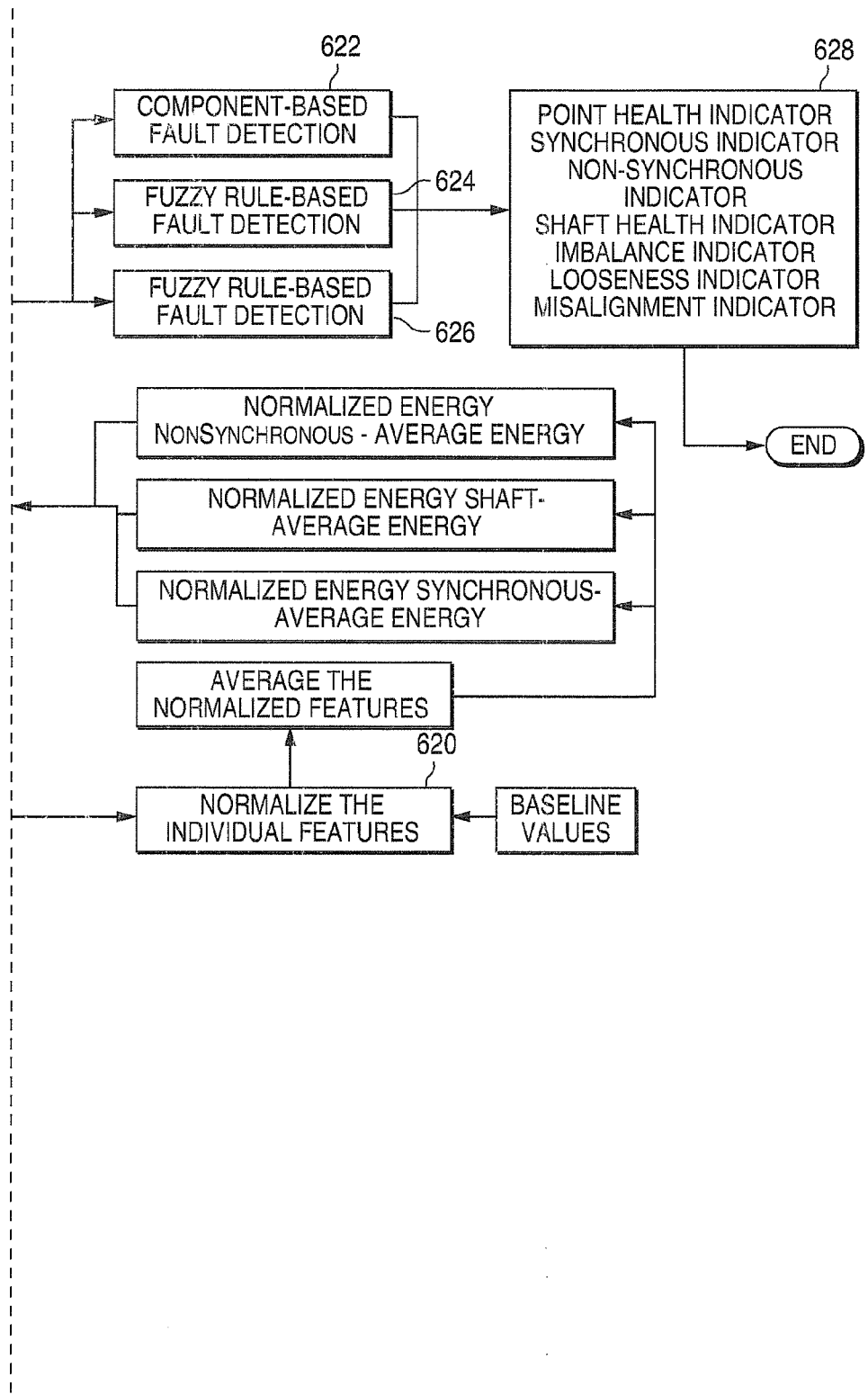

FIG. 6 illustrates an example combined blind fault detection method 600 according to this disclosure. The embodiment of the combined fault detection method 600 shown in FIG. 6 is for illustration only. Other embodiments could be used without departing from the scope of this disclosure.

In the combined fault detection method 600, the same three, families of frequencies are tracked, and normalization with respect to a baseline is done for each orientation and point. The average of these normalized features is determined, and the normalized features are again normalized by deducting from each the average energy. Then, fuzzy rule-based or rule-based diagnostics can be applied so as to obtain all the orientation indicators at that point, and again fusion of the orientation indicators can give rise to a point indicator.

As shown in FIG. 6, in block 602, the operator enters the number of points (n). In block 604, the number of orientations ($n_{I,J}$) is entered. The BFD device 300 determines the families of frequencies in block 606. In block 608, a counter initializes a Point I=1. In block 610, the BFD device 300 determines if I>n. If I≤n, an orientation counter initializes an orientation J=1 in block 612. In block 614, the BFD device 300 determines if J>$n_{I,J}$. If J≤$n_{I,J}$, the BFD device 300 initializes a family value K=1 in block 616. Alternatively, if J>$n_{I,J}$, the point value I is incremented to the next point in block 618.

The amplitudes of the families of frequencies are determined (similar to the point-wise method 400 in blocks 422-426). Also, the maximum amplitudes of these bands are determined (similar to the point-wise method 400 in blocks 428-432), and a matrix is formed of the maximum amplitudes and their frequencies in block 434. This process is repeated for each family of frequencies until all three families of frequencies have been computed.

Thereafter, the synchronous energy, shaft energy and non-synchronous energies are individually normalized in block 620 with respect to baseline values. That is, the BFD device 300 normalizes the Non-synchronous average energy, Shaft average energy and Synchronous average energy. The normalized energies are averaged in block 622. Then, the orientation is incremented to the next orientation in block 630. After each point and orientation has been computed, the BFD device 300 applies component-based fault detection (block 622), rule-based fault detection (block 624) and Fuzzy Rule-based fault detection (block 626). This is done to determine one or more of: a Point Health indicator, a Synchronous indicator, a Non-Synchronous indicator, a Shaft Health indicator, an Imbalance indicator, a Looseness indicator, and a Misalignment indicator in block 628.

In Rule-based fault detection (block 624), simple 'if else' logic can be used in order to conclude the decision. For example:
If (Normalized synchronous energy−Average energy>3) and (Normalized synchronous energy−Average energy>2) and (Average energy>3). Then Orientation Indicator=Alarm.
The user can choose the alert condition as 'Normal', 'Warning', and 'Alarm', or any other conditions can be included. Similarly, another variable can include placing a value into linguistic variables. For example, 'Normal' can be replaced by '1', 'Warning' can be replaced by '4', and 'Alarm' can be replaced by '7'.

In Fuzzy rule-based fault detection (block 626), each of the four variables can be assigned some membership functions depending upon their severity. The output function like 'Orientation Indicator' can also be assigned with some membership functions. Then, these functions can be related by fuzzy rules. After integration of these rules, the output can be determined.

In component-based fault detection (block 622), multiple streams of measurements are analyzed simultaneously to find the possible existence of linear or nonlinear correlations among them. In terms of these correlations, a statistical model can be formed irrespective of the relationships among the data streams governed by the physics of the underlying system or process. These measurements may be raw data in the form of horizontal, vertical and axial components of measurements collected at various locations over a time-span. Another alternative is to use pre-processed data instead of raw data as inputs to the model. This pre-processing provides a means of incorporating knowledge about the physics of the system. For example, normalized synchronous, non-synchronous and shaft energy can be used as pre-processed features, thus acting as virtual sensors. The statistical model can be based on a linear analysis or non-linear analysis. The data can be organized as a matrix, where columns refer to the pre-processed energy features and rows refer to the time instants.

Component-based fault detection can be subdivided into two categories: linear-component based analysis and nonlinear-component based analysis. General steps involved in both types of analysis will be delineated first. Then the linear-component based analysis steps will be elaborated. Nonlinear-component based methods may be realized in multifarious variants. Although a general procedure will be described, other embodiments could be used without departing from the scope of this disclosure.

Two types of functions or mappings are obtained (estimated) using some historical dataset or repository. One mapping takes measured (or pre-processed) data to a reduced-dimensioned space to form what are commonly referenced as latent variables. The other mapping takes the data from the latent variable space back to the original data space performing reconstruction.

Fault detection may be achieved by following either of the following two routes: Given any new data point if the reconstruction error exceeds some predetermined threshold a flag is raised OR if by passing this data point through the first of the aforesaid two mappings the obtained latent variable does not remain within some limited region a flag is raised.

These mappings are parameterized and the coefficient-parameters indicate the influence or contribution of the original variables on the latent variables or the reconstruction errors. Analysis of the contribution or influence reveals possible type of faults.

Steps involved in the analysis during component-based fault detection can include the following:

Step 1: Singular Value Decomposition (SVD) is performed on the matrix to obtain the matrices U, S and V as its factors: $X=USV^T$ where $V^T$ represents the transpose of the matrix V. Here, singular-values are arranged in decreasing order of magnitude in a diagonal matrix S. Two other matrices U, V provide vectors in the form of their rows and columns, which are used for rotating the data for better visualization and analysis.

Step 2: The non-zero singular-values are identified from the S matrix and the corresponding vectors from the V matrix. The identified vectors can be retained, and the others can be discarded.

Step 3: The square of the singular-value matrix is determined. The diagonal matrix contains the variances of the uncorrelated variables that are formed next. The number of components that can satisfactorily capture a large percentage of the total variance (sum of the diagonal elements) can be determined.

Step 4: From the truncated V matrix, vectors corresponding to the large variances found in Step 3 can be identified. Only these vectors from the truncated V matrix may be retained.

Step 5: Each row of the matrix is projected onto the columns of the V matrix obtained from Step 4 in order to obtain a projected data matrix. This matrix contains variables that are uncorrelated (whose variances were found in Step 3), and each variable is a linear combination of the original variables in "right proportions". Coefficients of these linear combinations are the elements of the retained vectors of the V matrix.

Step 6: The uncorrelated variables (or just the first one that contains most of the information as a result of its corresponding large variance) are tracked to infer about the health of the machine or equipment. Tracking can be performed by closely observing if these variables have crossed some predefined thresholds (which can be computed by various means with a corresponding degree of confidence attached to the ultimate prediction about the equipment health).

Step 7: When attempting to determine the type of degradation that has caused equipment health deterioration, one or more "contributions" of original variables can be obtained, such as normalized synchronous or non-synchronous energy, in the uncorrelated variable(s) that were being tracked. Therefore, the probable causes can be determined.

Therefore, in the case of linear-component based analysis, the aforesaid mappings are realized in the form of matrices, which are V and $V^T$; or sub-matrices obtained from them. In the case of nonlinear-component based analysis nonlinear functions are obtained (or to be precise, parameters defining these functions are obtained) by optimizing some cost function which represent either reconstruction error or retained variance.

Although the figures described above have illustrated various embodiments, any number of modifications could be made to these figures. For example, any suitable type(s) of gears, impellers, pumps, or other rotating equipment could be monitored, and any suitable type(s) of faults could be detected. Also, various functions shown as being performed by the BFD device 300 could be combined, further subdivided, or omitted and additional functions could be added according to particular needs. In addition, while FIGS. 4 through 6 each illustrates a series of steps, various steps in FIGS. 4 through 6 could overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit: and scope of this disclosure, as defined by the following claims.

What is claimed is:

1. An apparatus comprising:
an input interface configured to receive input signals from sensors associated with at least one stage of rotating equipment;
a processing unit configured to identify a fault in the rotating equipment using the input signals; and
an output interface configured to provide an indicator identifying the fault;
wherein the processing unit is configured to identify the fault by:
monitoring multiple families of frequencies in the input signals;
determining at least one average energy based on the multiple families of frequencies; and
comparing the at least one average energy to at least one baseline value; and
wherein the at least one average energy comprises an average energy of the multiple families of frequencies in the input signals from multiple sensors located at a common sensor point and having different measurement orientations.

2. The apparatus of claim 1, wherein the processing unit is configured to determine the average energy of the multiple families of frequencies in the input signals from the multiple sensors located at the common sensor point and having the different measurement orientations.

3. The apparatus of claim 2, wherein the different measurement orientations comprise a vertical orientation, a horizontal orientation, and an axial orientation.

4. The apparatus of claim 1, wherein the input signals comprise signals related to at least one of: a synchronous energy, a non-synchronous energy, and a shaft energy of the rotating equipment.

5. The apparatus of claim 1, wherein the processing unit is further configured to normalize the at least one average energy with respect to the at least one baseline value.

6. The apparatus of claim 5, wherein the processing unit is further configured to apply at least one of a rule-based fault detection process and a fuzzy rule-based fault detection process to the at least one normalized average energy.

7. The apparatus of claim 1, wherein the processing unit is configured to determine the average energies of the multiple families of frequencies in the input signals from multiple sensors having multiple measurement orientations at multiple sensor points.

8. The apparatus of claim 1, wherein the processing unit is further configured to determine an average energy of the multiple families of frequencies in input signals from multiple sensors located at different sensor points and having a common measurement orientation.

9. A system comprising:
multiple sensors each configured to measure one or more characteristics of rotating equipment; and
a blind fault detection device comprising:
an input interface configured to receive input signals from the sensors;
a processing unit configured to identify a fault in the rotating equipment using the input signals; and
an output interface configured to provide an indicator identifying the fault;
wherein the processing unit is configured to identify the fault by:
monitoring multiple families of frequencies in the input signals;
determining at least one average energy based on the multiple families of frequencies;
comparing the at least one average energy to at least one baseline value; and
wherein the at least one average energy comprises an average energy of the multiple families of frequencies in the input signals from multiple sensors located at a common sensor point and having different measurement orientations.

10. The system of claim 9, wherein the processing unit is configured to determine the average energy of the multiple families of frequencies in the input signals from the multiple sensors located at the common sensor point and having the different measurement orientations.

11. The system of claim 10, wherein the different measurement orientations comprise a vertical orientation, a horizontal orientation, and an axial orientation.

12. The system of claim 9, wherein the input signals comprise signals related to at least one of: a synchronous energy, a non-synchronous energy, and a shaft energy of the rotating equipment.

13. The system of claim 9, wherein the processing unit is further configured to normalize the at least one average energy with respect to the at least one baseline value.

14. The system of claim 13, wherein the processing unit is further configured to apply at least one of a rule-based fault detection process and a fuzzy rule-based fault detection process to the at least one normalized average energy.

15. The system of claim 9, wherein the processing unit is further configured to determine the average energies of the multiple families of frequencies in the input signals from multiple sensors having multiple measurement orientations at multiple sensor points.

16. The system of claim 9, wherein the processing unit is further configured to determine an average energy of the multiple families of frequencies in input signals from multiple sensors located at different sensor points and having a common measurement orientation.

17. A method comprising:
receiving input signals from sensors associated with at least one stage of rotating equipment;
identifying a fault in the rotating equipment using the input signals; and
providing an indicator identifying the fault;
wherein identifying the fault comprises:
monitoring multiple families of frequencies in the input signals;
determining at least one average energy based on the multiple families of frequencies;
comparing the at least one average energy to at least one baseline value; and
wherein the at least one average energy comprises an average energy of the multiple families of frequencies in the input signals from multiple sensors located at a common sensor point and having different measurement orientations.

18. The method of claim 17, wherein determining the at least one average energy comprises determining the average energy of the multiple families of frequencies in the input signals from the multiple sensors located at the common sensor point and having the different measurement orientations.

19. The method of claim 18, wherein the different measurement orientations comprise a vertical orientation, a horizontal orientation, and an axial orientation.

20. The method of claim 17, further comprising:
normalizing the at least one average energy with respect to the at least one baseline value; and
applying at least one of a rule-based fault detection technique and a fuzzy rule-based fault detection technique to the at least one normalized average energy.

21. The method of claim 17, wherein the input signals comprise signals related to at least one of: a synchronous energy, a non-synchronous energy, and a shaft energy of the rotating equipment.

22. The method of claim 17, wherein identifying the fault comprises determining the average energies of the multiple families of frequencies in the input signals from multiple sensors having multiple measurement orientations at multiple sensor points.

23. The method of claim 17, wherein determining the at least one average energy further comprises determining an average energy of the multiple families of frequencies in input signals from multiple sensors located at different sensor points and having a common measurement orientation.

24. A non-transitory computer readable medium embodying a computer program, the computer program comprising computer readable program code for:
receiving input signals from sensors associated with at least one stage of rotating equipment;
identifying a fault in the rotating equipment using the input signals; and
providing an indicator identifying the fault;
wherein the computer readable program code for identifying the fault comprises computer readable program code for:
monitoring multiple families of frequencies in the input signals;
determining at least one average energy based on the multiple families of frequencies; and
comparing the at least one average energy to at least one baseline value; and
wherein the at least one average energy comprises an average energy of the multiple families of frequencies in the input signals from multiple sensors located at a common sensor point and having different measurement orientations.

* * * * *